J. V. O. PALM.
LIQUID PACKING FOR PUMPS.
APPLICATION FILED DEC. 10, 1909.
Reissued Nov. 28, 1911. 13,325.
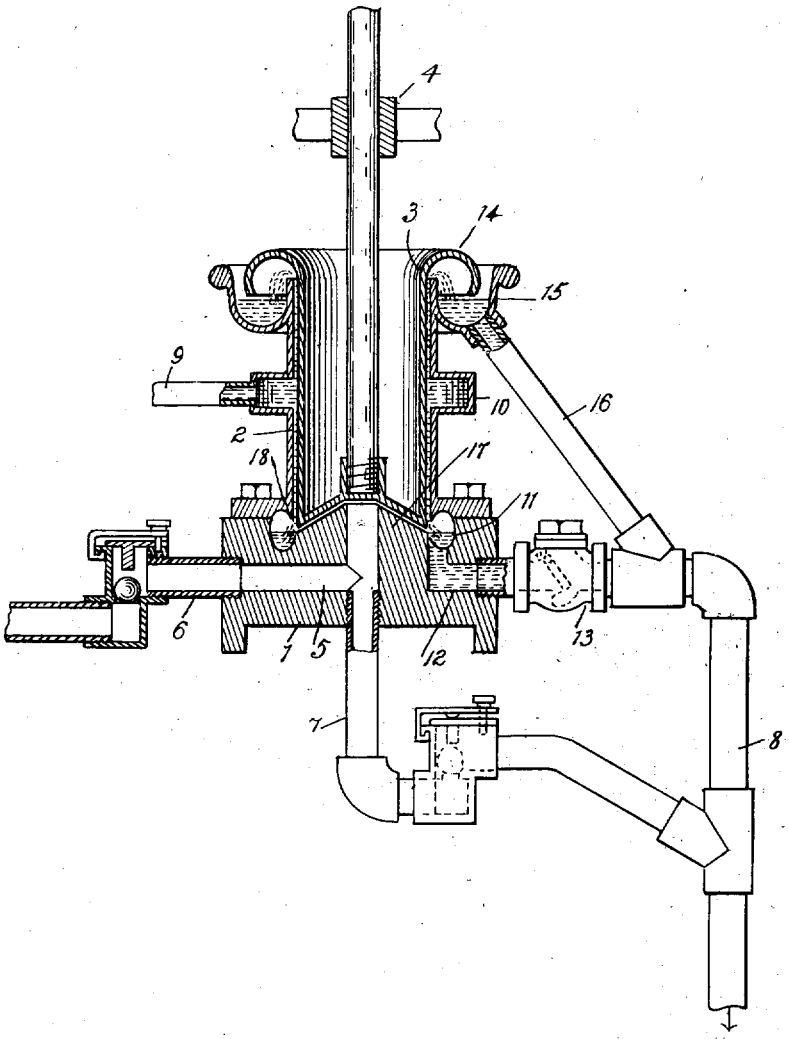
Witnesses
W. R. Flood
H. B. Belknap
Inventor
John V. O. Palm
By Whittemore, Hulbert & Whittemore
Attys

UNITED STATES PATENT OFFICE.

JOHN V. O. PALM, OF DETROIT, MICHIGAN, ASSIGNOR TO THE PALM VACUUM CLEANER COMPANY, OF DETROIT, MICHIGAN, A CORPORATION OF MICHIGAN.

LIQUID PACKING FOR PUMPS.

13,325. Specification of Reissued Letters Patent. Reissued Nov. 28, 1911.

Original No. 912,321, dated February 16, 1909. Serial No. 385,581. Application for reissue filed December 10, 1909. Serial No. 532,508.

*To all whom it may concern:*

Be it known that I, JOHN V. O. PALM, at present a resident of the city of Detroit, county of Wayne, and State of Michigan, having formerly resided in Milwaukee, in the county of Milwaukee and State of Wisconsin, have invented certain new and useful Improvements in Liquid Packing for Pumps, of which the following is a description, reference being had to the accompanying drawings, which are a part of this specification.

This invention relates to pumps and has for its object to provide a flowing liquid packing for a reciprocatory piston pump and thereby reducing to a minimum the friction between the piston and its cylinder and avoid detrimental action on the working parts of dust or the like contained in the material being pumped.

The invention is particularly designed for use with suction cleaning systems where a low degree of suction is required and where the presence of dust in the air being pumped constitutes a serious obstacle to the use of tight fitting pistons because of the erosive action of the dust on the working surfaces. The flowing liquid packing provided by this invention is sufficiently effective to permit of the low degree of suction being attained, and serves to avoid the necessity for a tight fitting relation between the piston and its cylinder, while carrying off any particles of dust that may come in contact therewith.

With the above and other objects in view, the invention consists in the pump herein claimed, and all equivalents.

The figure of the accompanying drawing represents a sectional elevation of a pump constructed in accordance with this invention, with parts arranged in the same plane for convenience of illustration.

In this drawing, 1 represents a base to which is removably secured a cylinder 2 having a piston 3 loosely mounted therein with a slight clearance on all sides, the piston rod working in a stationary guide 4 to prevent its contacting with the walls of the cylinder. An air passage 5 in the base opens to the interior of the cylinder at the axis thereof and communicates with a valved inlet pipe 6 and a valved outlet pipe 7, the former desirably connecting with the suction nozzle of a cleaning system and the latter connecting with a discharge pipe 8 leading to a sewer or other place of disposal.

A water pipe, from the city mains or other source of supply under pressure, connects with an annular space 10 formed in the walls of the cylinder 2 at about midway the length thereof, and the water thus delivered to the cylinder is of a sufficient quantity and under such a pressure that it will force its way upwardly as well as downwardly in the slight clearance space allowed between the piston and its cylinder and constitutes a film-like packing for the piston. The water which passes downwardly is collected in an annular chamber 11 formed in the base and communicating through a passage 12 with a valved outlet pipe 13 leading to the discharge pipe 8, before referred to. The water which passes upwardly from the annular space 10 is deflected by the outwardly turned rim 14 of the piston and is collected in a trough 15 formed about the upper end of the cylinder from which it is conducted through a pipe 16 to the discharge pipe 8.

The base 1 has a conical portion 17 which lies beneath the piston with its inclined surface rising from the circular groove or recess which forms the annular chamber 11 and having the air passage 5 opening at its apex. The conical portion 17 serves to shed water which may be splashed thereon into the surrounding chamber 11 and the shape of the piston end which corresponds therewith serves to form a drip flange to prevent the water running toward the center where it might fall into the air passage 5, it being an object to avoid the admission of water to the air passage where it might interfere with the proper operation of the check valves. The lower end of the cylinder is desirably grooved to complete the formation of the annular chamber 11 and to provide a depending drip flange 18 which will further assist in avoiding a splash of the water that would permit it to reach the air passage 5.

In operation, the piston 3 is reciprocated preferably at a comparatively high speed, and the water under pressure is admitted through the water pipe 9 to form the packing between the piston and its cylinder so that the piston will cause air to be drawn in through the valved inlet pipe 6 and to be forced out through the valved outlet pipe 7, the valves of these parts in practice being preferably located as close to the piston as possible to reduce the dead air space. During the upward stroke of the plunger the downward flow of water will be somewhat increased, owing to the suction created in the cylinder and to the reduced resistance to the flow of water in that direction, consequently provision is made in taking care of the streams of water at both ends of the cylinder to avoid undue splashing, the formation of the annular chamber 11 being such as to deflect the stream outwardly and prevent its splashing into the air passage and the formation of the downwardly curved rim 14 of the piston being such as to deflect the water downwardly into the trough 15 and avoid its being splashed outside thereof.

During the suction stroke of the piston the water in the passage 12 is prevented from being drawn back into the cylinder by the check valve in the outlet pipe 13, and the speed of the piston is such that there is not sufficient time during the suction stroke for water to back up behind this check valve to a degree that would enable it to reach the air passage 5.

By means of this invention, an air pump is provided which not only is relieved from retarding friction of a tight working piston, but which is also free from the scratching and clogging effect of dust in the air being pumped and the usual strainers between the pump and the suction nozzle may therefore be dispensed with and their objectionable features eliminated. By removing the dust laden air and water together they become thoroughly mixed and the dust is taken from the air so that when conveyed to a sewer or the like there is no objectionable discharge of dust.

What I claim is:

1. A reciprocating piston pump having a clearance space between the piston and its cylinder and means for introducing a constant flow of liquid into the clearance space to form a packing for the piston.

2. A reciprocating piston pump having an unconfined clearance space between the piston and its cylinder and means for supplying a constant flow of liquid to said clearance space and for collecting it therefrom.

3. A pump, comprising a cylinder having inlet and outlet ports, a piston loosely mounted in the cylinder with a clearance space therebetween, means for supplying the clearance space with flowing liquid at an intermediate part of the cylinder, and means for collecting the discharged liquid at both ends of the cylinder.

4. A pump, comprising a valved vertical cylinder, a piston loosely mounted therein, means for causing liquid under pressure to flow through the space between the piston and the cylinder and constitute a flowing packing, a deflecting flange at the upper end of the piston, and a receiver for collecting the liquid deflected thereby.

5. A pump, comprising a valved vertical cylinder, a piston loosely mounted therein, means for supplying liquid under pressure to flow through the space between the piston and the cylinder and constitute a flowing packing, a deflecting flange at the upper end of the piston, a flange on the upper end of the cylinder forming a trough to receive the liquid deflected by the deflecting flange, and a conductor for discharging the water from the trough.

6. A pump, comprising a valved vertical cylinder, a piston loosely mounted therein, means for delivering liquid under pressure to flow through the space between the piston and the cylinder and constitute a flowing packing, an annular chamber formed at the lower end of the cylinder to collect the liquid, and valve-controlled means for conveying the liquid therefrom.

7. A pump, comprising a vertical cylinder, a piston loosely mounted therein with a space therebetween, means for admitting liquid to the space between the piston and the cylinder to form a packing, a chamber at the lower end of the cylinder to collect the liquid, and means for discharging liquid from the upper end of the cylinder and from the chamber.

8. A pump, comprising a vertical cylinder, a piston loosely mounted therein, means for admitting flowing liquid between the piston and the cylinder to form a piston packing, a base closing the end of the cylinder and having a valved air passage opening to the cylinder, a collecting chamber in the base surrounding the mouth of the air passage, and valved means for conducting the liquid from the collecting chamber.

9. A pump, comprising a cylinder, a piston loosely mounted therein with a space therebetween, means for introducing flowing liquid to the space between the piston and the cylinder, a base closing the end of the cylinder and having a valved air passage opening to the interior of the cylinder, a conical guard on the base surrounding the mouth of the air passage to shed liquid therefrom, a collecting chamber surrounding the conical guard, and a valved conducting means through which the liquid may be discharged from the collecting chamber.

10. A pump, comprising a cylinder, a piston loosely mounted therein with a space therebetween, means for introducing flowing liquid to the space between the piston and the cylinder, a base closing the end of the cylinder and having an air passage opening to the interior of the cylinder, a conical guard on the base surrounding the mouth of the air passage to shed liquid therefrom, a collecting chamber surrounding the conical guard, a valved conducting means through which the liquid may be discharged from the collecting chamber, and a drip flange on the lower end of the piston.

11. A pump, comprising a cylinder, a piston loosely mounted therein with a space therebetween, means for introducing flowing liquid to the space between the piston and the cylinder, a base closing the end of the cylinder and having an air passage opening to the interior of the cylinder, a conical guard on the base surrounding the mouth of the air passage to shed the liquid therefrom, a collecting chamber surrounding the conical guard, a valved conducting means through which the liquid may be discharged from the collecting chamber, and a depending flange on the lower end of the cylinder to prevent the liquid splashing into the mouth of the air passage.

12. A pump, comprising a cylinder, a piston loosely mounted therein with a space therebetween, means for introducing flowing liquid to the space between the piston and the cylinder, a base closing the end of the cylinder and having an air passage opening to the interior of the cylinder, a conical guard on the base surrounding the mouth of the air passage to shed liquid therefrom, a collecting chamber surrounding the conical guard, a valved conducting means through which the liquid may be discharged from the collecting chamber, a drip flange on the lower end of the piston, and a depending flange on the lower end of the cylinder to prevent the liquid splashing into the mouth of the air passage.

13. A pump, comprising a vertical cylinder, a piston loosely mounted therein with a space therebetween, an annular space formed in the walls of the cylinder at an intermediate part thereof, means for admitting liquid to the annular space to constitute a flowing liquid packing for the piston, and means for discharging the liquid at the ends of the cylinder.

14. A pump, comprising a cylinder, a piston loosely mounted in the cylinder with a space therebetween, means for admitting flowing liquid to the space between the piston and the cylinder, means for collecting the liquid at the ends of the cylinder, and a guide for the piston to prevent its engagement with the walls of the cylinder.

15. A pump, comprising a cylinder, a piston loosely mounted therein with a space therebetween, means for admitting flowing liquid to the space between the piston and the cylinder to constitute a packing, the cylinder being provided with valved inlet and outlet ports, and means for collecting the liquid from the ends of the cylinder into which the outlet port discharges.

16. In an apparatus for handling dust laden air, the combination of adjacent members having a clearance space therebetween, an air connection communicating with one of said members, means for flowing a liquid between said members to form a seal for the air for flushing the surfaces exposed to the dust with the liquid from said seal and for discharging the liquid with the dust laden air to cleanse the latter.

17. In an apparatus for handling dust laden air, an air chamber formed by relatively movable inclosing members having a clearance space therebetween, means for introducing a liquid into the clearance space between said members to form a seal and for flushing the inner surface of said chamber with the fluid from said seal.

18. In an apparatus for handling dust laden air, a suction air chamber formed by relatively movable inclosing members having a clearance space therebetween, and means for introducing a liquid into said clearance space and for feeding said liquid into said chamber to flush the inner surface thereof by the suction within the chamber.

19. In an apparatus for handling dust laden air, an air chamber formed by relatively movable inclosing members having a clearance space therebetween, means for relatively moving said members to develop a suction within said chamber, and means for introducing a liquid into the clearance space between said members to form a seal and to flush the inner surface of said chamber by the liquid drawn therein from said seal.

In testimony whereof I affix my signature in the presence of two witnesses.

JOHN V. O. PALM.

Witnesses:
NELLIE KINSELLA,
W. J. BELKNAP.